(12) United States Patent
Spiegel

(10) Patent No.: US 7,004,011 B1
(45) Date of Patent: Feb. 28, 2006

(54) LEAK DETECTOR

(76) Inventor: Bill Spiegel, 101 W. Palmetto, Arcadia, FL (US) 34266

( * ) Notice: Subject to any disclaimer, the term of this patent is extended or adjusted under 35 U.S.C. 154(b) by 0 days.

(21) Appl. No.: 10/751,140

(22) Filed: Jan. 5, 2004

Related U.S. Application Data

(63) Continuation of application No. 09/604,436, filed on Jun. 27, 2000, now abandoned, and a continuation of application No. 08/258,440, filed on Jun. 10, 1994, now Pat. No. 5,551,290.

(51) Int. Cl.
*G01M 3/04* (2006.01)

(52) U.S. Cl. ............................. 73/40; 73/322; 73/290 R

(58) Field of Classification Search ............ 73/290 R, 73/40, 49.2, 311, 322; 116/110, 227, 228; 340/624
See application file for complete search history.

(56) References Cited

U.S. PATENT DOCUMENTS 2,086,645 A * 7/1937 Staber ...................... 73/290 R
3,538,746 A * 11/1970 Ginsburgh et al. .......... 73/49.2
4,646,560 A * 3/1987 Maresca et al. ............. 73/49.2
5,551,290 A * 9/1996 Spiegel ...................... 73/311
5,744,701 A * 4/1998 Peterson et al. ............ 73/49.2

* cited by examiner

*Primary Examiner*—Hezron Williams
*Assistant Examiner*—Rodney Frank
(74) *Attorney, Agent, or Firm*—Frank A. Lukasik

(57) ABSTRACT

A device for detecting leaks in containers that are open to the effects of rain and/or evaporation comprising an outer cylinder or container partially submerged in a container or vessel to be measured, such as, a swimming pool, three adjustable legs attached to the bottom of the outer cylinder, an inner tube having a bottom edge fastened to the bottom, an outer, floating guide cap, and an inner floating indicating rod. The device is placed in a swimming pool and submerged to a selected level. The inside of the outer cylinder is filled to a particular level and the relationship of the floating indicator rod and the guide cap is recorded. Periodically, the level is checked to see if there is a change in the level due to a leak in the pool or container. The relationship of the floating indicator rod and the guide cap indicates a net leak in the pool or vessel being tested.

2 Claims, 6 Drawing Sheets

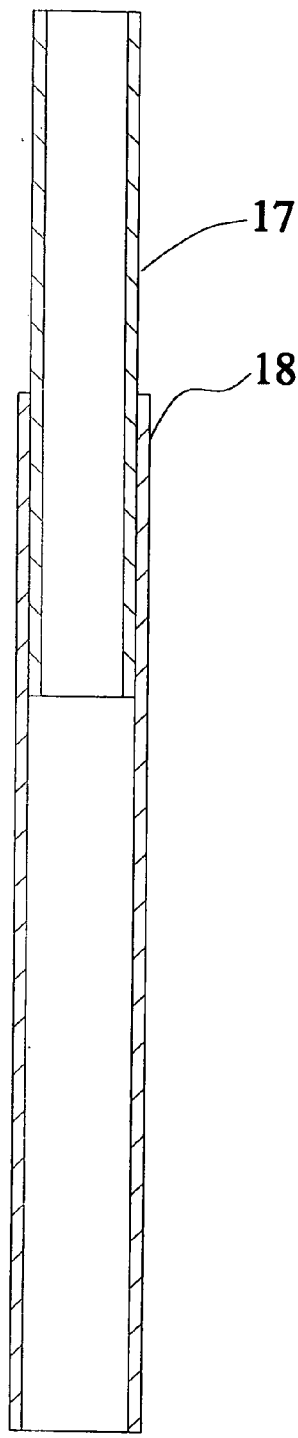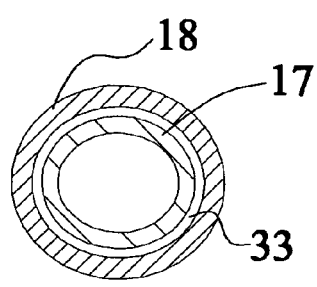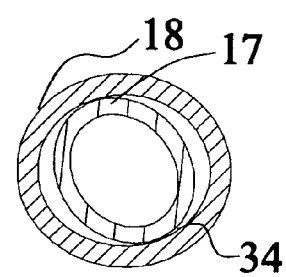
Fig. 4
Fig. 5
Fig. 6

LEAK DETECTOR

RELATED INVENTIONS

The instant invention is a Continuation of application Ser. No. 08/258,440 filed Jun. 10, 1994, now U.S. Pat. No. 5,551,290, Issued Sep. 3, 1996 and U.S. application Ser. No. 09/604,436, Filed Jun. 27, 2000, now abandoned.

BACKGROUND OF THE INVENTION

1. Field of the Invention

The present invention relates generally to detecting leaks in containers that are open to the effects of rain and/or evaporation, and more particularly, to detecting leaks in swimming pools.

2. Discussion of the Prior Art

The accurate measurement of the contents of a sunken tank or an open container at any desired time has presented a problem to the trade, and numerous objections have arisen to the methods heretofore employed for this purpose.

It is well known by swimming pool operators that a pool will suffer a considerable loss of water due to evaporation. It is also well known that the operator of a gasoline filling station suffers annually considerable loss due to lsekage and evaporation of the gasoline in the sunken tank. A leaking pool is more likely to happen and very difficult to detect, especially in dry climates.

Several prior art portable fluid level gauges are available. U.S. Pat. No. 1,908,196 to Talbot discloses a portable liquid level gauge which comprises a relatively long metal cylinder having a perforate closure at the bottom and a plug closing the top, the plug having a central aperture and a recess providing a gauge bar seat of non-circular cross section, a gauge bar of non-circular cross section at its base, the base being adapted to be removably received in the seat and the gauge bar having a plurality of faces, each face being marked for a different tank and being adapted to occupy a plurality of angular positions in its seat, a metal float within the cylinder, and a float level indicating rod on the float, the rod passing through the aperture in the plug, and the extremity thereof in association with the markings on one face for the gauge bar to indicate the liquid contents of the tank.

U.S. Pat. No. 2,232,921 to Kuhlman discloses a barrel gauge, comprising a tube, open at both ends, and extending from the upper end of the tube to a point adjacent its lower end is a narrow slot. The calibrated member that is arranged to slide freely through the tube is formed of metal and square or non-circular in cross section. The ends of the rod are plugged to increase its buoyancy. Secured to the lower end portion of the graduated member is a float which may be of cork or other light material held in place on the rod by a one piece resilient gripping member. Formed through the float is an axial opening that is slightly larger in diameter than the tube and the resilient arms bear against the surface of the body of the float surrounding the opening and as the arms tend to flex outwardly or spread apart they engage and grip the float with friction and pressure. The graduated rod being connected to the float will be held in position with its upper portion projecting above the upper end of the tube and the reading of the graduated mark that appears in line with or just above the upper end of the tube will denote the liquid contents within the barrel.

U.S. Pat. No. 3,691,839 to Lasher discloses a portable gauge for measuring the fluid contents of a container having an opening circumscribed by a substantially horizontal wall portion, the gauge having a base adapted to rest on the wall portion, a transparent float extended through the base for free elevational movement with respect thereto, and a scale extended longitudinally of the float adjacent to the base for visual comparison therewith, the scale being calibrated in terms of the volumetric contents of the container at various fluid levels therein.

U.S. Pat. No. 3,983,752 to Holt discloses an oil level gauge for vehicles which have an oil reservoir in a relatively inaccessible location. An upright tube of small diameter has an open lower end below the lowest level of oil in the reservoir, and an upper end which is in a location that is readily viewed by a person checking the oil level. A gauge rod in the tube has a float at its lower end and has a bright colored enlargement at its upper end which is visible through a sight glass in a fitting that surmounts and seals the top of the tube. The float and the enlargement serve to guide the rod.

U.S. Pat. No. 5,551,290 to Spiegel is a first embodiment of the instant invention wherein the device is suspended in a swimming pool by a chain or rope attached to the outer cylinder.

SUMMARY OF THE INVENTION

The structure of the present invention combines an outer cylinder, mounted on three adjustable legs, and placed in a container being measured, such as, for example a swimming pool or tank, an inner tube, an outer floating tube, and an inner floating indicating rod. The inner tube is fastened to the bottom of the outer cylinder and a hole is formed in the bottom of the outer cylinder. The inside of the outer cylinder is filled to a particular level and the relationship between the two floats is recorded. Periodically, the level is checked to see if there is a change in the relationship between the two floats by reading the gauge marks on the floating indicating rod.

BRIEF DESCRIPTION OF THE DRAWINGS

FIG. 4 is a sectional view of one leg of the invention.

FIG. 5 is a top sectional view of the two parts of a leg.

FIG. 6 is a top sectional view of the two parts of a leg engaged in a force fit.

DESCRIPTION OF THE PREFERRED EMBODIMENT

Figure 1:
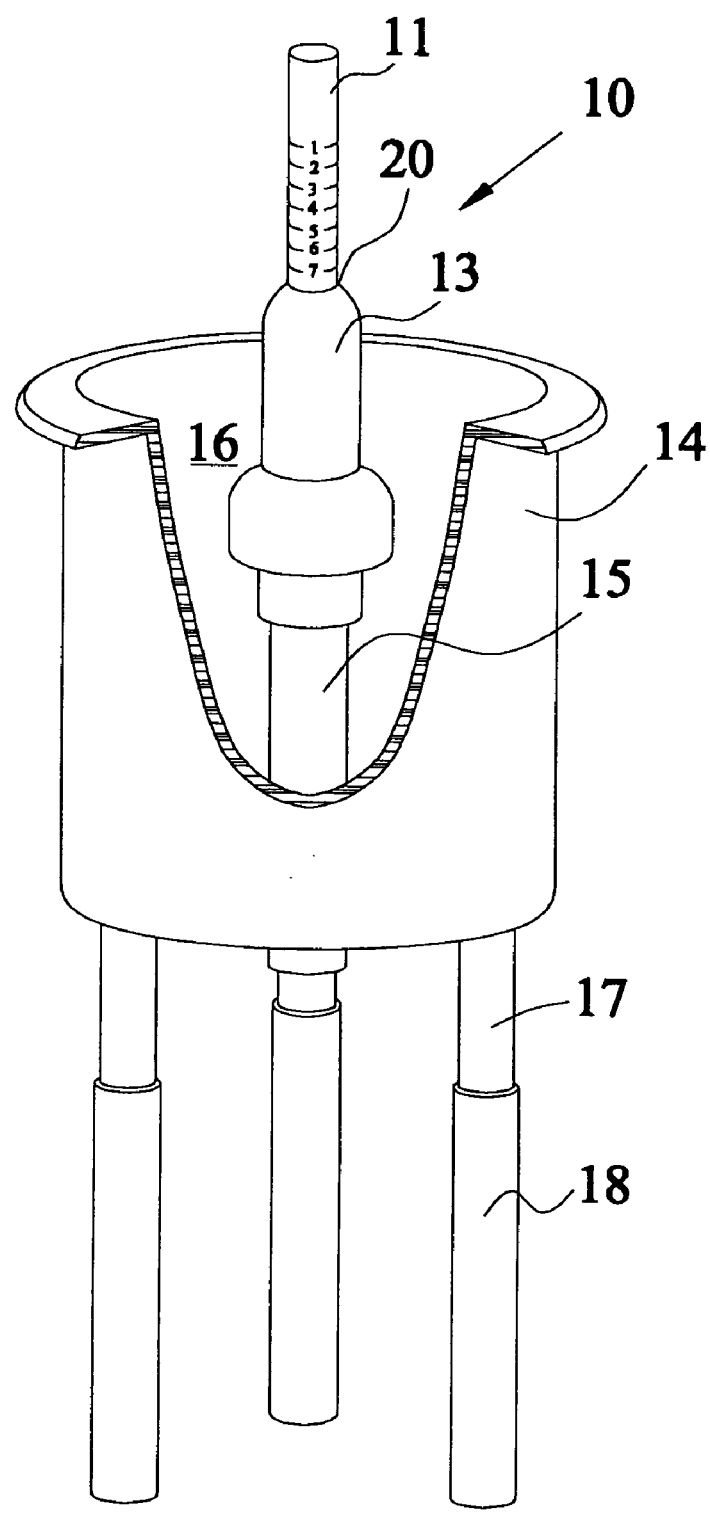
FIG. 1 is a perspective top, plan view of the leak detector of the present invention.
Figure 2:
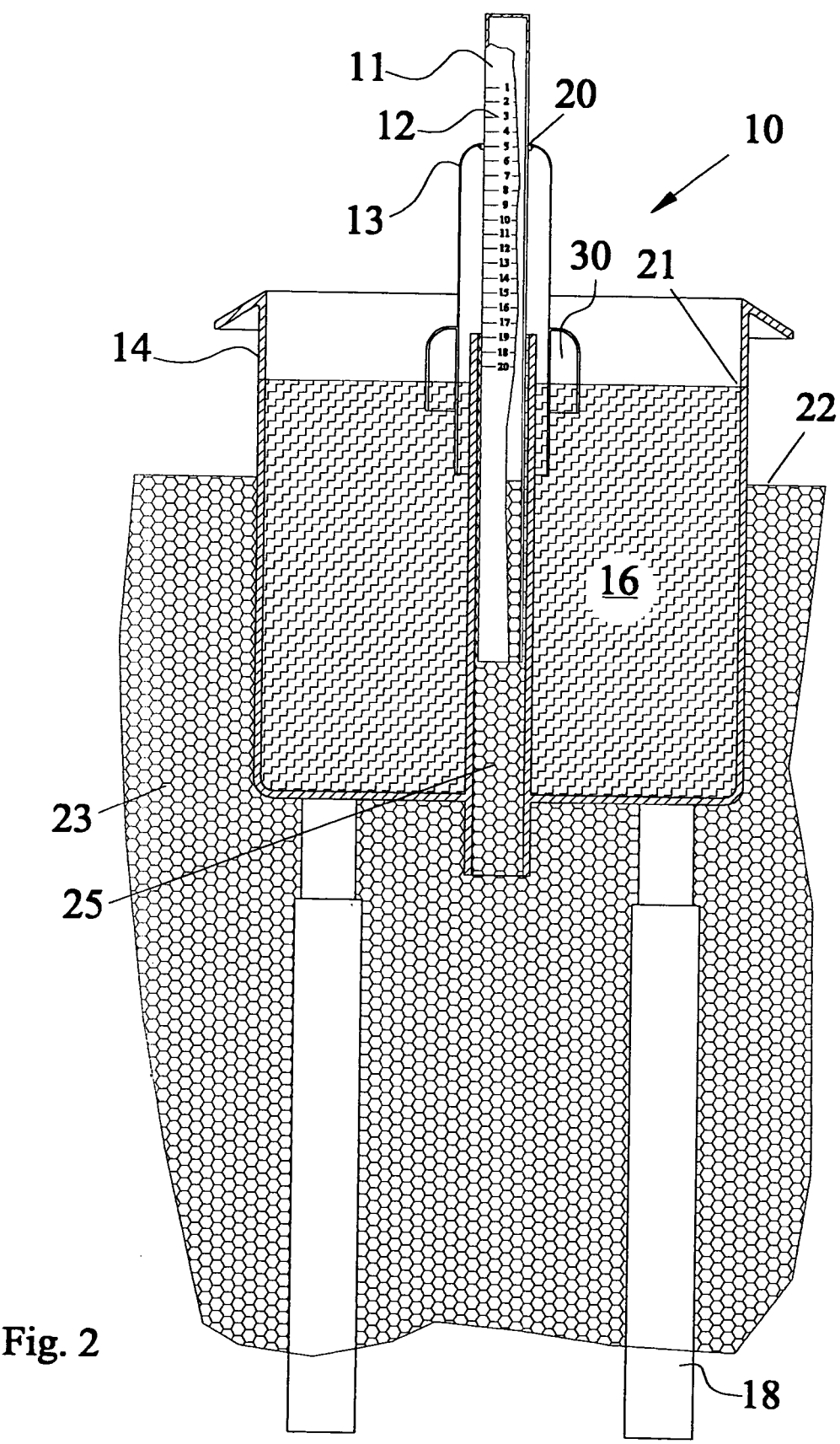
FIG. 2 is a sectional view of the leak detector of the present invention showing the liquid levels.
Figure 3:
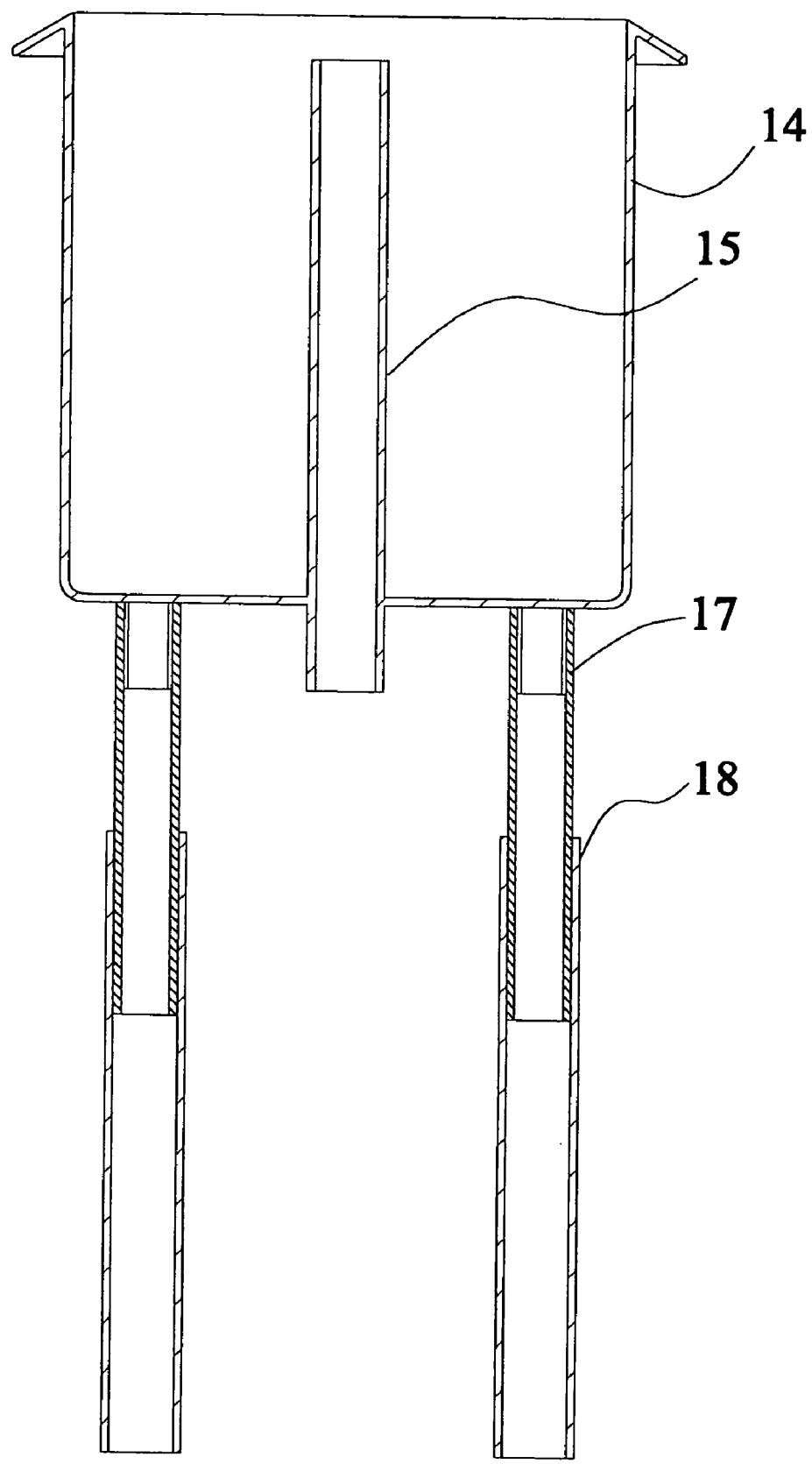
FIG. 3 is a sectional view of the outer cylinder and an inner tube assembled on three legs in accordance with the present invention.
Figure 7:
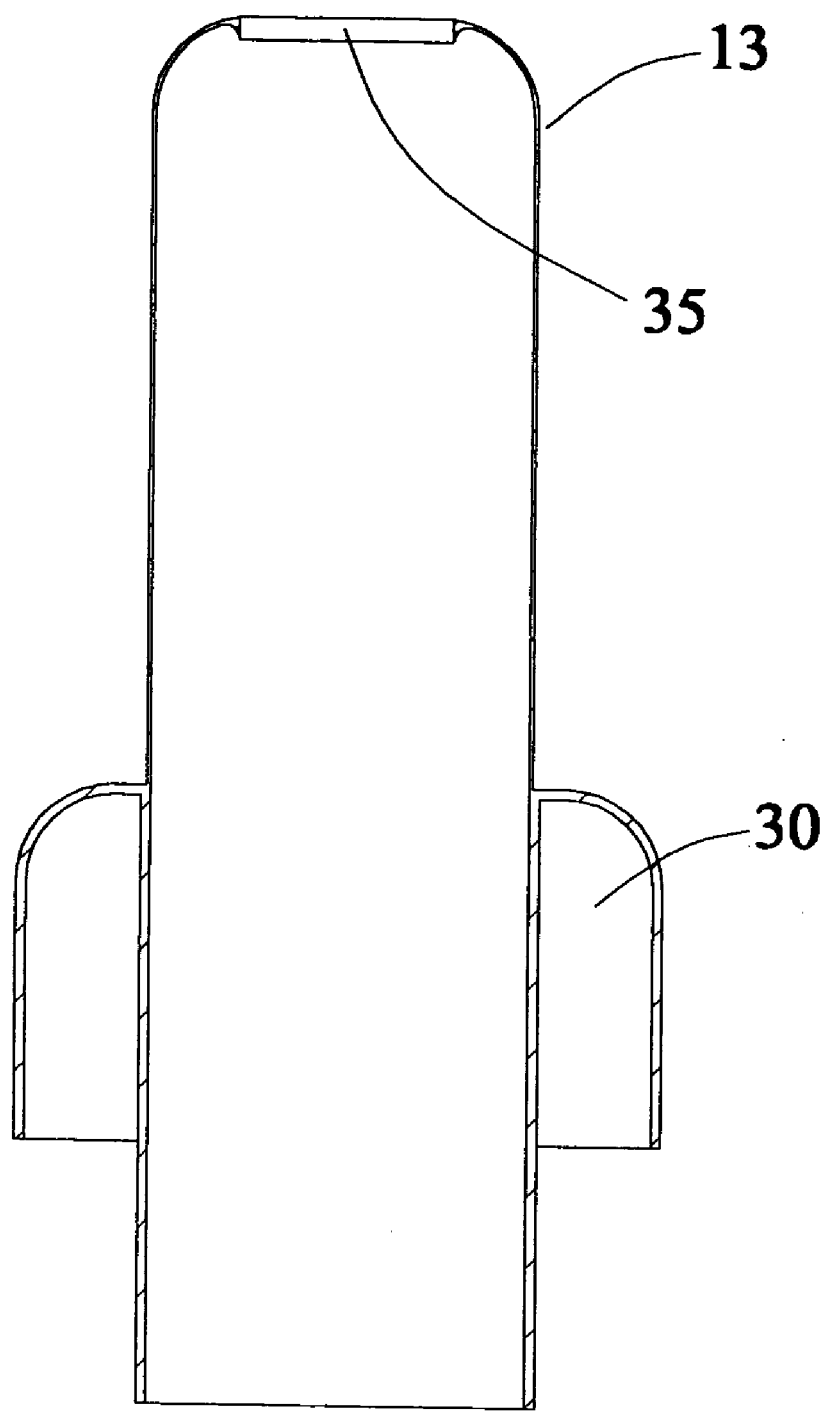
FIG. 7 is a sectional view of an outer floating tube in accordance with the present invention.

Referring to the drawings in detail, and referring first to FIGS. 1 and 2, there is illustrated the leak detector of the invention, designated by the numeral 10. Leak detector 10 is comprised generally of an outer cylinder 14, placed in the water 23 of a swimming pool, or the container being measured. The telescoping leg sections 18 are set at a length to set the outer cylinder 14 at a height to provide a sufficient amount of water relative to the height of pool water surface 22 of the swimming pool. An inner tube 15 is fastened to the bottom 31 of outer cylinder 14 as shown in FIG. 3 to provide an entry 25 for the pool water 23 to be measured. Three feet 36 are formed on the bottom 31 to mount the smaller diameter leg section 17 and the telescoping leg section 18.

As shown in FIGS. 4–6, leg sections 17 and 18 are oval shaped and are locked in a set position by rotating one section in the meeting until the surfaces bind together to hold the sections in a set position. Numeral 33 depicts the space between leg sections 17 and 18 in an unlocked position and FIG. 6 depicts the binding of the two leg sections 17 and 18 as indicated by numeral 34.

Figure 8:
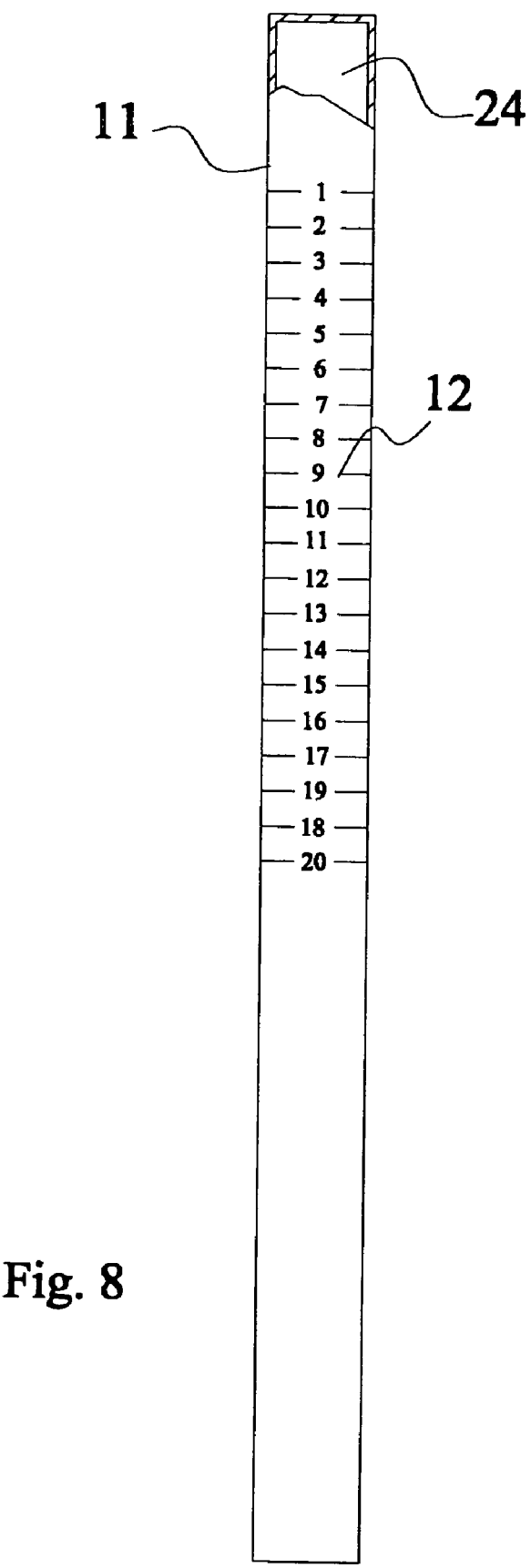
FIG. 8 is a side view of an inner, floating, indicating rod in accordance with the present invention.

Inner, floating, indicating gauge 11, shown in FIG. 8, consists of a rod having graduated lines 12 at the top end and a hollow center 24 which provides an air float which floats in the pool water 23 which rises in inner tube 15 to the level of the column of pool water 23 entering through water inlet 32. Indicating gauge 11 provides an actual indication of the level 22 of the pool or vessel being tested.

Guide cap 13 is placed over the top of inner tube 15 to guide indicating gauge 11 and to provide a reference point 20 to take a reading from graduated lines 25 of indicating gauge 11. Environmental compensation chamber 29 is formed within the area between the outer cylinder 11 and the inner tube 15. Inner chamber 25 fluid level 22 and container fluid level 22 are shown in FIG. 2 at the same level, which is kept level by action of water inlet 32.

Guide cap 13 consists of tube 37, hole 35 and air chamber float 30. Guide cap 13 slides over inner tube 15 and floats on the fluid 16 of environmental compensation chamber 29. The change in liquid level 22 is determined by reading the level mark as indicated by the reference point 20 of guide cap 13, on graduations 12 located on indicating guage 11. Graduations 12 are also used to compensate for the change of liquid level 21 due to rain or evaporation of the liquid in environmental compensation chamber 29.

In a preferred embodiment outer cylinder 14, inner tube 15 and guide cap 13 were made of plastic. Guide cap 13 contains an air chamber float 30 to provide the necessary buoyancy.

The primary purpose of the instant invention is to solve a problem that exists in determining if containers that are open to the effects of rain and/or evaporation are leaking or not. These two factors often make it difficult to determine if the loss of liquid in a container is increased by evaporation or masked by rainfall. The instant invention compensates for these two factors and effectively makes it possible by reading one gauge to determine the actual loss due to a leak in the container being measured. This is accomplished by the use of two containers suspended in the container being measured. An inner floating indicating gauge 11 floats inside of the inner chamber 25 and responds to the gross level change that occurs in the container being measured. The guide cap 13 floats in the environmental compensation chamber 29 and responds only to environmental changes. The net difference is read on the graduations 12 and it's change in relationship with the top edge 20 of the guide cap 13. This change is the actual loss that occurred in the container being measured.

Of course, it should be understood that a wide range of changes and modifications can be made to the preferred embodiment described above. It is therefore, intended that the foregoing descriptions be regarded as illustrative rather than limiting, and that it can be understood that it is the following claims, including all equivalents, which are intended to define the scope of the invention.

What is claimed is:

1. A liquid level indicating device for detecting a leak in a liquid container that is open to the effects of rai and/or evaporation, said device comprising:

an outer cylinder placed in the water in the container and parrtially submerged in the liquid, said outer cylinder having a bottom witn a hole formed vertically through the center and an inner tube having a bottom edge fastened to said bottom thereby forming an inner chamber above said hole for holding a volume of liquid at the level of the container, three adjustable legs attached to said bottom, and an environmental compensation chamber formed between said inner tube and said outer cylinder for holding a reference volume of liquid to measure environmental changes in liquid volume, a guide cap placed over said inner tube, said guide cap consisting of a tube having a first end and a second end, said first end having a hole for providing a reference point for taking readings, and an air chamber fastened near said second end, said guied cap tube being inserted on said inner tube and floating on said reference volume of liquid, and responding only to envirionmental changes, an inner floating indicating gauge inserted in said hole in said guide cap and in said inner chamber and consisting of a rod having a first end with graduted lines formed thereon for indicating liquid level, said first end being inserted in, and guided by said guide cap hole top edge being a reference point and a second end with a float formed thereon and floating on said inner tube level volume of liquid at the level of the container liquid, said indicating gauge responding to gross liquid level changes in the container, whereby a net difference of liquid levels is indicated on said inner floating indicating gauge graduations by the change in relationship with said guide cap hole top edge cap.

2. A liquid level indicating device of claim 1 wherein each of said adjustable legs consist of a first length section and a second length section of telescoping, oval shaped, tube sections, said leg sections being locked in a set position by rotating said second length section in a mating relationship with said first length section thereby binding said section togetner in a set position.

\* \* \* \* \*